April 23, 1963   J. A. KUECKEN   3,087,154
HEIGHT FINDING MECHANISM
Filed Oct. 18, 1957
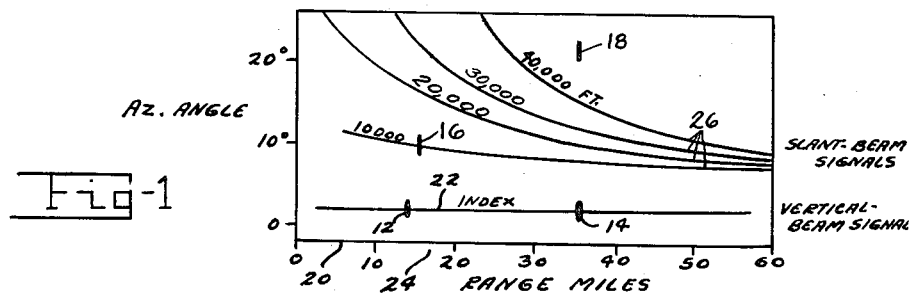
Fig-1
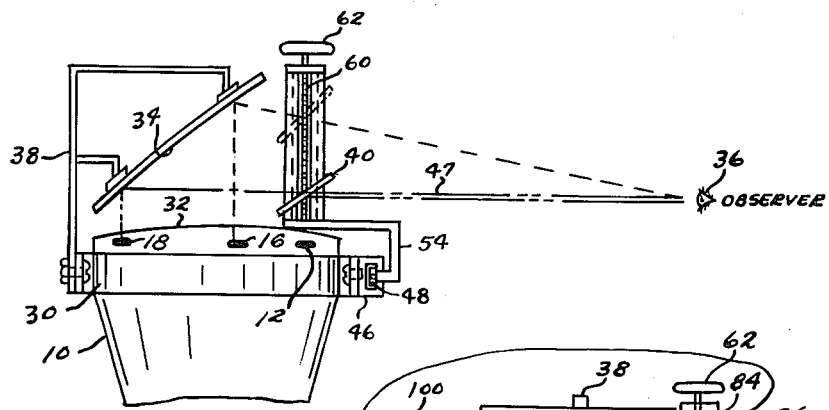
Fig-2
Fig-3
Fig-4
INVENTOR.
JOHN A. KUECKEN
BY Wade Koontz
S. A. Strickler
ATTORNEYS United States Patent Office 3,087,154
Patented Apr. 23, 1963

3,087,154
HEIGHT FINDING MECHANISM
John A. Kuecken, Cincinnati, Ohio, assignor to the United States of America as represented by the Secretary of the Air Force
Filed Oct. 18, 1957, Ser. No. 691,114
1 Claim. (Cl. 343—10)

The present invention relates to a height finding mechanism and particularly to a system to indicate directly the range height information on the range height indication scope of a V-beam radar system.

The V-beam radar system utilizing a pair of angularly displaced antennas mounted as a single unit has been widely used to give height, range and azimuth of airborne targets (See MIT Radiation Laboratory Series, volume 1, pages 192–196). The fundamental principle of the V-beam radar is to reduce the observation of elevation angle to a double observation of azimuth angle. The first observation of azimuth is made by a vertical fan beam and the second observation is made by a fan beam slanted at an angle (preferably 45°) to the first search beam. The two beams form a V-shaped trough. The rotation of the trough reproduces the value of the height as the horizontal distance between the vertical and slant beams at the appropriate range and height. The returns are received on a B-scope to which is applied an overlay having range and constant height lines from which the operator can estimate the range and height.

This V-beam system has certain drawbacks such as:
(1) The operator must accurately split the range and height returns with a vertical index.
(2) He then must estimate the reading of range and height from the lines on the overlay.
(3) The information must be reported verbally.

The present system provides an optical system easily actuated to allow the operator to accurately locate the range and height returns and an electrical system responsive to the actuation of the optical system to accurately indicate directly either to the operator or at a distance the range and height information.

In the construction according to the invention a fixed mirror is mounted adjacent to the face of the scope to reflect the height returns on the scope substantially transversely of the scope to the eye of an operator and a movable mirror is mounted for movement parallel to the face of the scope to pick up the range returns on the scope and reflect the image thereof to the eye of the operator after which the movable mirror is adjusted vertically to superimpose the range and height returns in a single line of sight to the operator.

The range and height corresponding to the returns shown by the adjustment of the optical system is indicated by a metering system including a voltage source, an impedance or potentiometer energized from the source and means responsive to the range setting to provide a potential proportional to the range and a second impedance connected to be energized by the potential proportional to the range and means responsive to the height adjustment to provide a potential proportional to the height at that range. Two independent voltmeters are utilized to indicate the range and height.

It is accordingly an object of the invention to provide an improved range-height finding system.

It is a further object to provide a direct reading height finder. It is another object to provide a height finder having automatic data transmission.

Other objects and advantages of the height finder system will be apparent from the following detailed description taken in conjunction with the accompanying drawing in which:

FIGURE 1 is a plan view of a simple V-beam indicator having an overlay showing range and height indications;

FIGURE 2 is an end elevation of the optical system according to the invention;

FIGURE 3 is a front elevation of the optical system, with parts broken away and showing the manner of connecting the electrical elements; and FIGURE 4 is a schematic illustration of the electrical circuit.

FIGURE 1 illustrates the B-scope displays in a V-beam radar of the vertical beam return 12 and the slant beam return 16 for one target, and the vertical beam return 14 and the slant beam return 18 of another target at greater range. These returns are shown in conjunction with the known type overlay 20 having an index or range line 22 on which the vertical beam returns will fall. A range scale 24 is shown adjacent the index line 22. Slant beam height lines 26 are shown in curved convergent relation to the index 22. Usually the slant beam is spaced 10° from the vertical beam so that at 0 elevation the height lines 26 will be spaced 10° from the index 22 in order to provide positive separation of the returns even at 0 elevation. In this known type of operation the operator applies a vertical index to the simultaneous returns such as 12 and 16 and adjusts the index to split the return pips. The range can then be read on the scale 24 and the height estimated from the height lines 26.

In an exemplary construction as shown in FIGURES 2 and 3 the B-scope 10 is mounted in a frame 30 to locate the display screen or face 32 substantially horizontal. A fixed mirror 34 is mounted adjacent the back side of the face 32 and arranged obliquely thereto to project the images of the height returns 16 and 18 substantially transversely of the face 32 to the eye 36 of an observer. The mirror 34 is preferably curved to correct for parallax so that the position of the observer remains substantially constant. The mirror 34 may be fixed in any suitable manner such as by a bracket 38 secured to frame 30.

A half silvered mirror 40 has a vertical cut off or index 42. The mirror 40 is mounted for horizontal movement along the face 32 to bring the range return 12 into view and is then adjusted so that the index 42 substantially bisects the image 43 of the range return 12. The mirror 40 is then adjusted to superimpose image 43 of the range return and image 45 of the height return in a single line of sight 47 between the observer 36 and the mirrors 40 and 34.

A conventional mounting for movable mirror 40 is constituted as a horizontal track way 46 mounted in any desired fashion as by bolting to the frame 30. A nut or range cursor 48 is mounted in track way 46 and is traversed therealong by feed screw 50 herein shown as actuated by hand wheel 52, although it is apparent that motor driven means may be preferable to more rapidly adjust the nut 48. A bracket 54 is fixed to nut 48 and carries a vertical track way 56 preferably extending substantially above the location of the range returns on face 32. A nut or height cursor 58 is mounted in track way 56 and traversed by feed screw 60 herein shown as actuated by hand wheel 62. An arm 64 fixed on nut 58 supports the movable mirror 40.

The nut 48 is traversed along track way 46 to pick up the range return and then nut 58 is traversed along track way 56 to secure coincidence of range and height returns. These mechanical movements may be utilized to energize meters 110 and 100 calibrated to read the range and height directly.

A suitable circuit for energizing the meters 110 and 100 is shown in both FIGURES 3 and 4. This circuit incorporates a range potentiometer and a height potentiometer. The range potentiometer consists of a slide wire resistor 70 mounted on track 46 by insulators 72 and 74 and a sliding contact 76 rigidly mounted on bracket 54 by insulator 78. The height potentiometer consists of resistor 80 mounted on track 56 by insulators 82 and 84 and a sliding contact 86 mounted on arm 64 by insulator 88. The maximum height end 83 of resistor 80 is connected to slider 76 and the zero height end 96 of this resistor is connected to the zero range end 94 of resistor 70. A source of direct current 90 is connected between maximum range end 92 and zero range end 94 of resistor 70. Meter 100 indicates the voltage between slider 86 and zero height end 96 of resistor 80 and meter 110 indicates the voltage between slider 76 and zero range end 94 of range resistor 70.

It is seen from FIGURE 1 that for any given target range, such as the range indicated by vertical beam return 12, the height is directly related to the difference between the azimuth of the vertical beam return 12 and the slant beam return 16. It is also apparent that, for any given difference in the azimuth angles of the vertical and slant beam returns, the height is directly related to range. Therefore, height is a direct function of both range and angular difference. As seen in FIGURE 3, and more clearly in FIGURE 4, the deflection of meter 100 is directly related to both the displacement of slider 76 from the zero range end 94 of resistor 70 and the displacement of slider 86 from the zero height end 96 of resistor 80. Consequently, if the displacement of slider 76 is made proportional to range and the displacement of slider 86 is made proportional to the difference in the azimuth angles of the vertical and slant beam returns, the deflection of meter 100 is directly related to these two quantities and the meter can be calibrated to read height. Since the deflection of meter 110 is proportional to the displacement of slider 76, this meter can be calibrated to read range.

The above conditions are fulfilled by the mechanism shown in FIGURES 2 and 3. The device is first adjusted by turning wheel 52 until the index 42 on mirror 40 is aligned with the center of the image 43 of a vertical antenna return such as 14. The displacement of slider 76 from end 94 is then proportional to the range of this target. The vertical position of mirror 40 is next adjusted by wheel 62 until the image 43 coincides with the image 45 of the corresponding slant beam return 18 as seen through the semitransparent mirror 40. The displacement of the slider 86 from end 96 of resistor 80 is then proportional to the difference in the azimuth angles of the vertical and slant beam returns. When these adjustments have been made, the height and range of the target may be read from meters 100 and 110, respectively.

As stated earlier, V-beam radar systems usually have a predetermined fixed angular separation between the vertical and slant beams of sufficient magnitude that the vertical and slant beam returns from a target at zero height are not superimposed on the cathode ray tube screen but have a definite predetermined separation. To conform with this feature, the mechanism of FIGURES 2 and 3 is so designed that, when mirror 40 has the proper vertical position to superimpose in the observer's eye vertical and slant beam returns having this predetermined angular separation, the slider 86 is at the zero height end 96 of resistor 80.

While for purposes of exemplification a particular embodiment has been shown and described according to the best present understanding thereof, it will be obvious to those skilled in the art that changes and modifications in the construction and arrangement of the parts may be resorted to without departing from the true spirit and scope of the invention.

I claim:

A height indicator for use with a V-beam radar having means for providing a target display on a substantially flat display surface in which range is indicated along one axis and azimuth along another axis at right angles to the range axis and in which each target is represented by a vertical beam return image and a slant beam return image which have the same position along the range axis but are separated along the azimuth axis by an angular difference that is directly related to the height of the target and inversely related to the range of the target, whereby the height of any target may be determined as a direct function of range and said angular difference, said height indicator comprising: a mirror having a reflective surface parallel to said range axis and at an angle to said display surface, said mirror being of sufficient size and at such angle as to reflect any slant beam return image transversely of said display surface to the eye of an observer at an observation point; a small semitransparent mirror having its reflective surface parallel to said range axis and at such angle to said dislay surface as to reflect to the eye of the observer at said observation point any vertical beam return image within its field of view, said semitransparent mirror having an index line normal to said range axis; means for moving said semitransparent mirror in a direction parallel to said range axis from a zero range position to a maximum range position of said index line for aligning said index line with the vertical beam return image of a selected target; means for moving said semitransparent mirror in a direction normal to said display surface from a zero height position, at which the distance between mirror and display surface is maximum, to a maximum height position, at which this distance is a minimum, for superimposing in the eye of the observer at said observation point the slant and vertical beam return images of the selected target, said zero height position being that position at which the return images of a target at zero height are superimposed; means actuated by the movement of said semitransparent mirror parallel to said range axis for producing a range voltage proportional to the displacement of said index line from its zero position; means receiving said range voltage and actuated by the movement of said semitransparent mirror normal to said display surface for deriving from said range voltage a height voltage which is a fraction of said range voltage the magnitude of which fraction is proportional to the displacement of said semitransparent mirror from its zero height position; and means calibrated to read height for indicating the magnitude of said height voltage.

References Cited in the file of this patent

UNITED STATES PATENTS

| | | |
|---|---|---|
| 2,518,968 | Wolff | Aug. 15, 1950 |
| 2,603,777 | Ranger | July 15, 1952 |
| 2,621,555 | Fleming-Williams | Dec. 16, 1952 |
| 2,696,610 | Turley | Dec. 7, 1954 |
| 2,700,762 | Lee | Jan. 25, 1955 |
| 2,804,613 | Haworth | Aug. 27, 1957 |